United States Patent
Chen

(10) Patent No.: US 6,996,834 B2
(45) Date of Patent: Feb. 7, 2006

(54) DISK DRIVE WITH EJECTION APPARATUS

(75) Inventor: Chun-Ting Chen, Tainan (TW)

(73) Assignee: Benq Corporation, Taoyuan (TW)

( * ) Notice: Subject to any disclaimer, the term of this patent is extended or adjusted under 35 U.S.C. 154(b) by 273 days.

(21) Appl. No.: 10/444,894

(22) Filed: May 22, 2003

(65) Prior Publication Data

US 2003/0227855 A1 Dec. 11, 2003

(30) Foreign Application Priority Data

Jun. 11, 2002 (TW) ...................................... 91208664 U

(51) Int. Cl.
*G11B 17/03* (2006.01)

(52) U.S. Cl. ..................................................... 720/610
(58) Field of Classification Search .................. 720/610
See application file for complete search history.

(56) References Cited

U.S. PATENT DOCUMENTS 5,878,012 A * 3/1999 Watanabe et al. ........... 720/653
6,111,838 A * 8/2000 Akiba ......................... 720/610
6,826,764 B2 * 11/2004 Fujisawa ..................... 720/610

FOREIGN PATENT DOCUMENTS

JP 08265717 A * 10/1996
JP 09044955 A * 2/1997

* cited by examiner

*Primary Examiner*—David D. Davis
(74) *Attorney, Agent, or Firm*—Snell & Wilmer L.L.P.

(57) ABSTRACT

A disk drive with an ejection apparatus having a locking pin and a latch is provided. The locking pin is movably disposed on the tray while the latch is rotatably disposed on the housing. The latch includes a blocking part and a guiding part. When a tray is received in the disk drive, the blocking part of the latch engages with the locking pin. When the tray is ejected, the tray is pushed toward the inner space of the housing. Subsequently, the locking pin escapes from the blocking part and moves to the guiding part of the latch. The locking pin moves along the guiding part and therefore the tray is ejected.

16 Claims, 8 Drawing Sheets

DISK DRIVE WITH EJECTION APPARATUS

This application claims priority of Taiwan Patent Application Serial No. 091208664 entitled "Disk Drive with Eject Apparatus", filed on Jun. 11, 2002.

FILED OF THE INVENTION

The present invention relates to an ejection apparatus of a disk drive and, more particularly, to a two-step ejection apparatus of a disk drive.

BACKGROUND OF THE INVENTION

As technologies progress, a disk drive has become a standard peripheral to a personal computer. A typical disk drive includes a tray that has a disk thereon and is driven into the disk drive to proceed with data reading and other actions. In general, a user controls movements of the tray by depressing a button on the disk drive. However, when the disk drive or power fails, the tray has to be ejected manually.

A conventional disk drive has a locking pin disposed on the tray and a latch disposed on the housing. The locking pin engages with the latch while the tray is received in the disk drive. When the tray is ejected, a solenoid switch forces the latch to rotate. Subsequently, the locking pin escapes from the latch, and the tray is ejected from the disk drive. The disk drive also has a drive link connecting to the latch. When the tray needs to be ejected manually, a stick pushes the drive link through an ejection hole. The drive link forces the latch to rotate, and therefore the locking pin escapes from the latch so that the tray is ejected.

Since electronic devices are produced in smaller size nowadays, if an ejection apparatus used in a disk drive does not have a drive link, space is saved and a disk drive with a smaller volume is possible.

SUMMARY OF THE INVENTION

One aspect of the present invention is to provide an ejection apparatus used in a disk drive. The tray is ejected manually by pushing the tray toward an inner space of the disk drive.

Another aspect of the present invention is to provide a two-step ejection apparatus used in a disk drive so that careless operation does not cause ejection of the tray.

The present invention discloses a disk drive with an ejection apparatus. A housing of the disk drive has an inner space. A tray is selectively received in the inner space. An ejection apparatus includes a locking pin movably disposed on the tray and a latch rotatably disposed on the housing. The latch has a guiding part and a blocking part. The guiding part has a first surface and a second surface. The locking pin engages with the blocking part to limit movements of the tray when the tray is received in the inner space. When the tray is pushed toward the inner space for a predetermined distance, the locking pin escapes from the blocking part and presses against the first surface. The locking pin pressing against the first surface forces the latch to rotate, and moves to the second surface. Afterwards, the locking pin moves along the second surface so that the tray is ejected from the inner space of the housing.

To avoid ejection of the tray by careless operation, the ejection apparatus further includes a block device. The block device is disposed on the tray and has a protrusion touching against the housing to stop the tray from being pushed toward the inner space of the housing. When the tray is ejected manually, a stick triggers the block device through an ejection hole, and the tray is pushed toward the inner space for the predetermined distance. As described above, the locking pin escapes from the latch, so the tray is ejected from the inner space of the housing.

The block device may also be disposed on the housing and touches against the tray. In this arrangement, the block device also can prevent the tray from being ejected by careless operation and is triggered by a stick through the ejection hole.

DETAILED DESCRIPTION

The present invention discloses an ejection apparatus used in a disk drive. The disk drive does not have a drive link. The ejecting movement of tray is achieved by pushing the tray toward the inner space of the housing. For preventing the tray from ejecting by careless operation, the ejection apparatus may include a block device. The tray is ejected after the block device is triggered.

Figure 1:
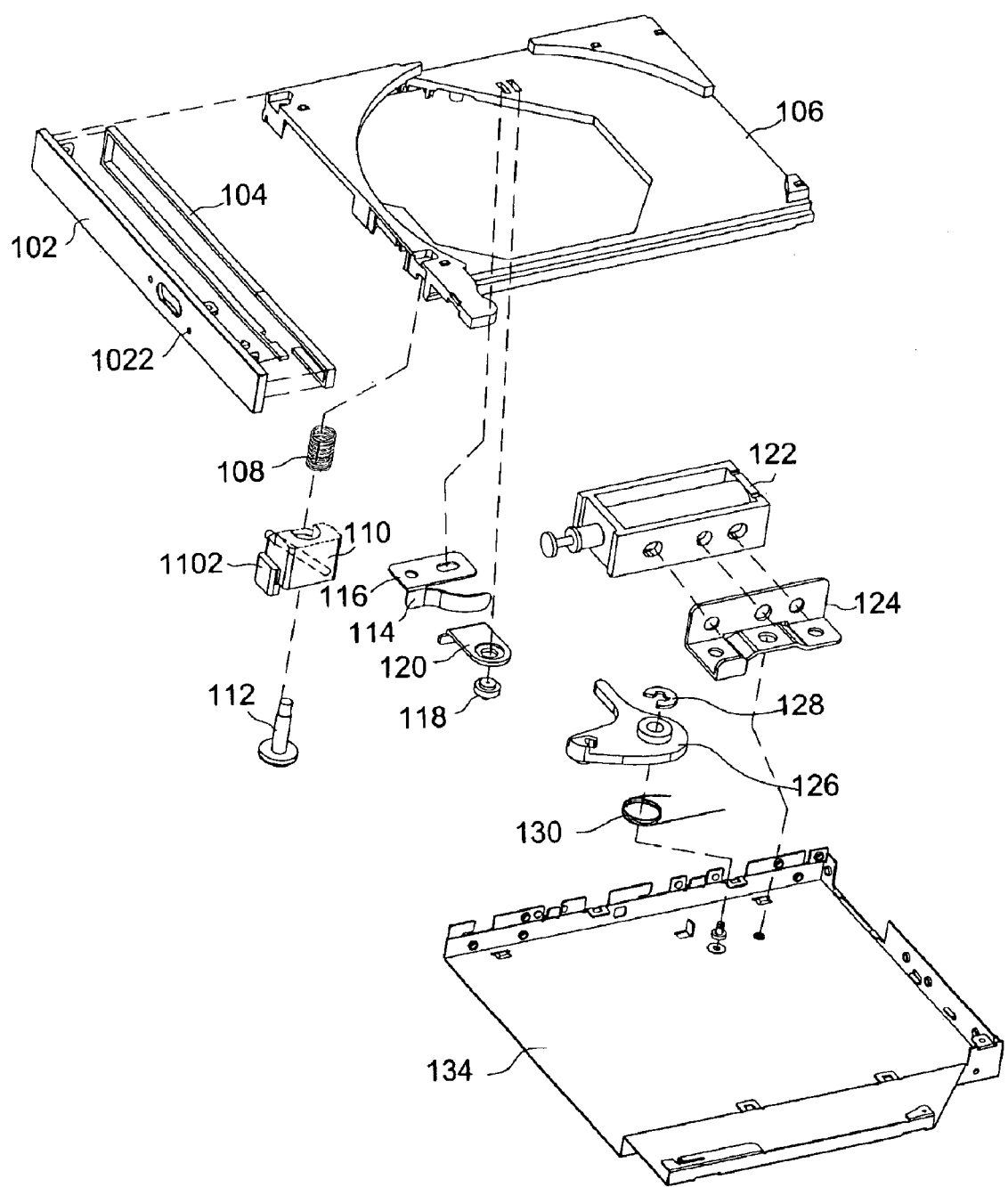
FIG. 1 is an explosive view of an exemplary disk drive of the present invention.

In FIG. 1, the disk drive is shown in an explosive view. The disk drive includes a panel 102, a tray 106 and a housing 134. The housing 134 has an inner space, and the tray 106 is selectively received in the inner space. A sponge 104 is selectively disposed between the panel 102 and the tray 106. An ejection hole 1022 is located on the panel 102. A locking pin 118 is disposed on a base 120, and the base 120 is movably disposed on the rear part of the tray 106. A leaf spring 114 is disposed on the leaf spring base 116. The leaf spring base 116 is disposed on the rear part of the tray 106 and located close to the base 120.

A latch 126 and a torsion spring 130 are disposed on the housing 134 and are attached together by an E-clip 128. A solenoid switch 122 and a solenoid switch base 124 are disposed on the housing 134. In general, the solenoid switch 122 controls the movements of the latch 126 to make the tray 106 ejected from or received in the inner space of the housing 134. These operations are known by those skilled in the art and are not described redundantly.

Figure 2:
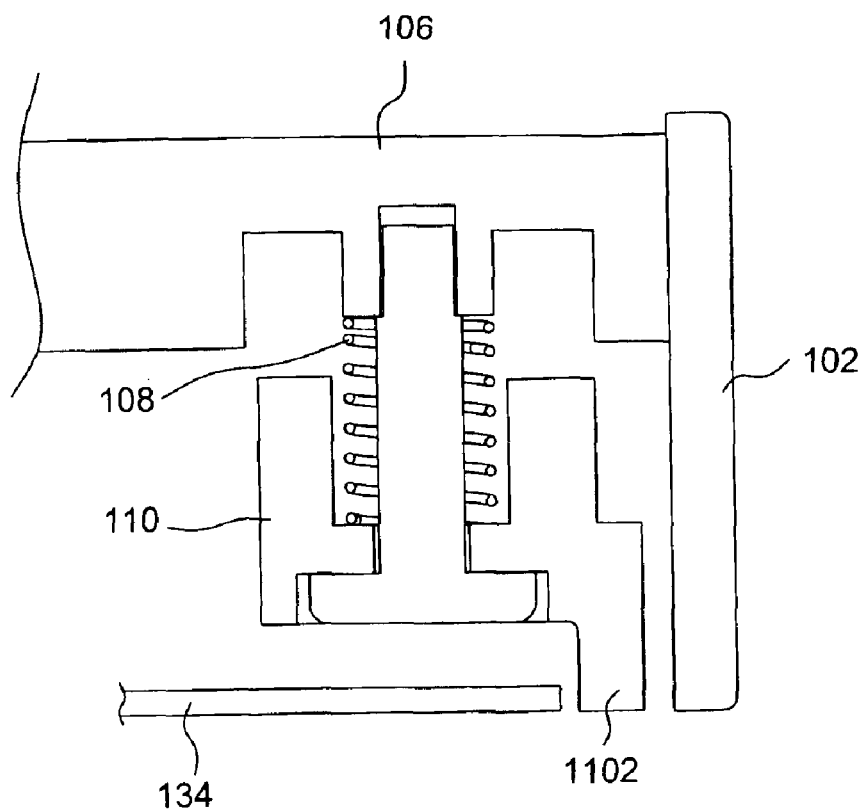
FIG. 2 is a diagram showing a position of the block device.

In FIG. 1 and FIG. 2, a block device 110 is selectively disposed on the rear part of the tray 106. The block device 110 has a protrusion 1102 touching against the housing 134 to prevent the tray 106 from being pushed carelessly. The block device 110 may be secured by a screw 112 on the rear part of the tray 106. A spring 108 is selectively disposed between the block device 110 and the tray 106. In another embodiment, the block device 110 may be disposed on the housing 134 and touches against the tray 106. Other possible substitute positions of the block device 110 are apparent to persons skilled in the art, so is not described or illustrated redundantly.

Figure 3:
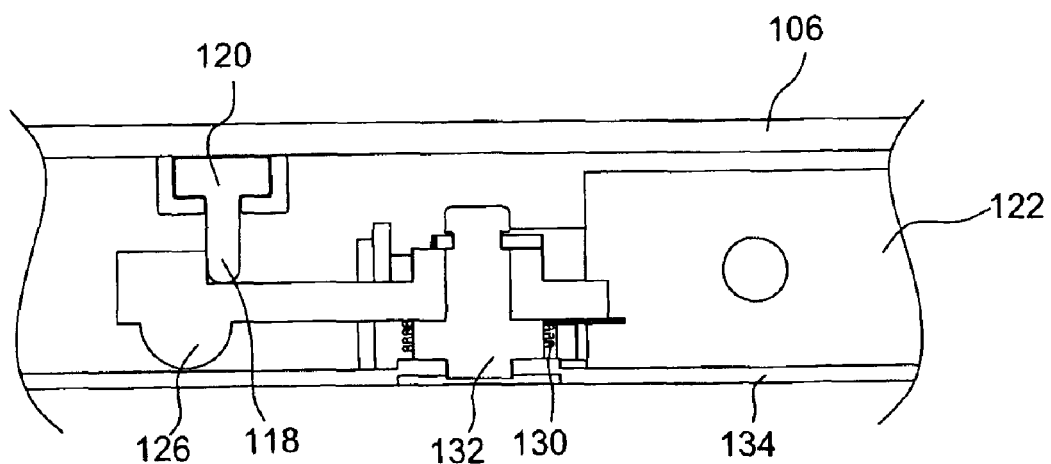
FIG. 3 is a side view showing that a locking pin engages with a latch while the tray is received in the disk drive.

FIG. 3 is a side view showing the locking pin 118 engaging with the latch 126. When the tray 106 is received in the disk drive, the locking pin 118 engages with the latch 126 so that the tray cannot be ejected. The base 120 is movably disposed on the rear part of tray 106. The moving direction of the base 120 is preferably perpendicular to the ejection direction of the tray 106. As shown in FIG. 2, the block device 110 touches against the housing 134, so the tray 106 cannot be pushed toward the inner space of the housing 134. At this stage, the tray 106 is immovable.

Figure 4A:
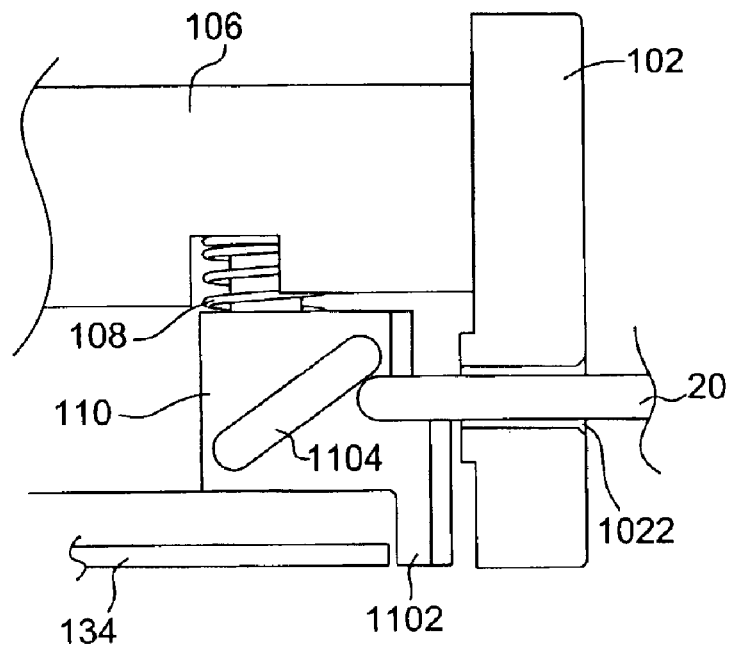
FIG. 4A and FIG. 4B are diagrams showing that a tray is pushed toward the inner space of the disk drive after the stick triggers the block device.
Figure 4B:
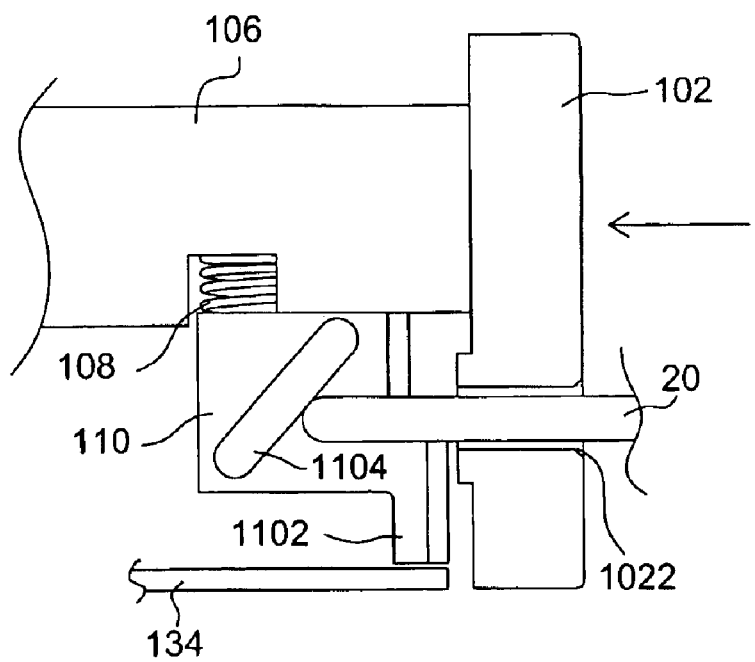

When the disk drive or power fails, the tray 106 has to be ejected manually. In FIGS. 4A and 4B, a stick 20 triggers the block device 110 through the ejection hole 1022. The block device 110 has an inclined surface 1104. When the stick 20 touches against the inclined surface 1104 and pushes toward the inner space of the disk drive, the block device 110 moves upwards, as shown in FIG. 4B. Subsequently, the protrusion 1102 of the block device 110 escapes from the housing 134, so the tray 106 can be pushed toward the inner space. The spring 108 provides a resilient force to drive the block device 110 back to an original position after the stick 20 leaves the inclined surface 1104.

Figure 5A:
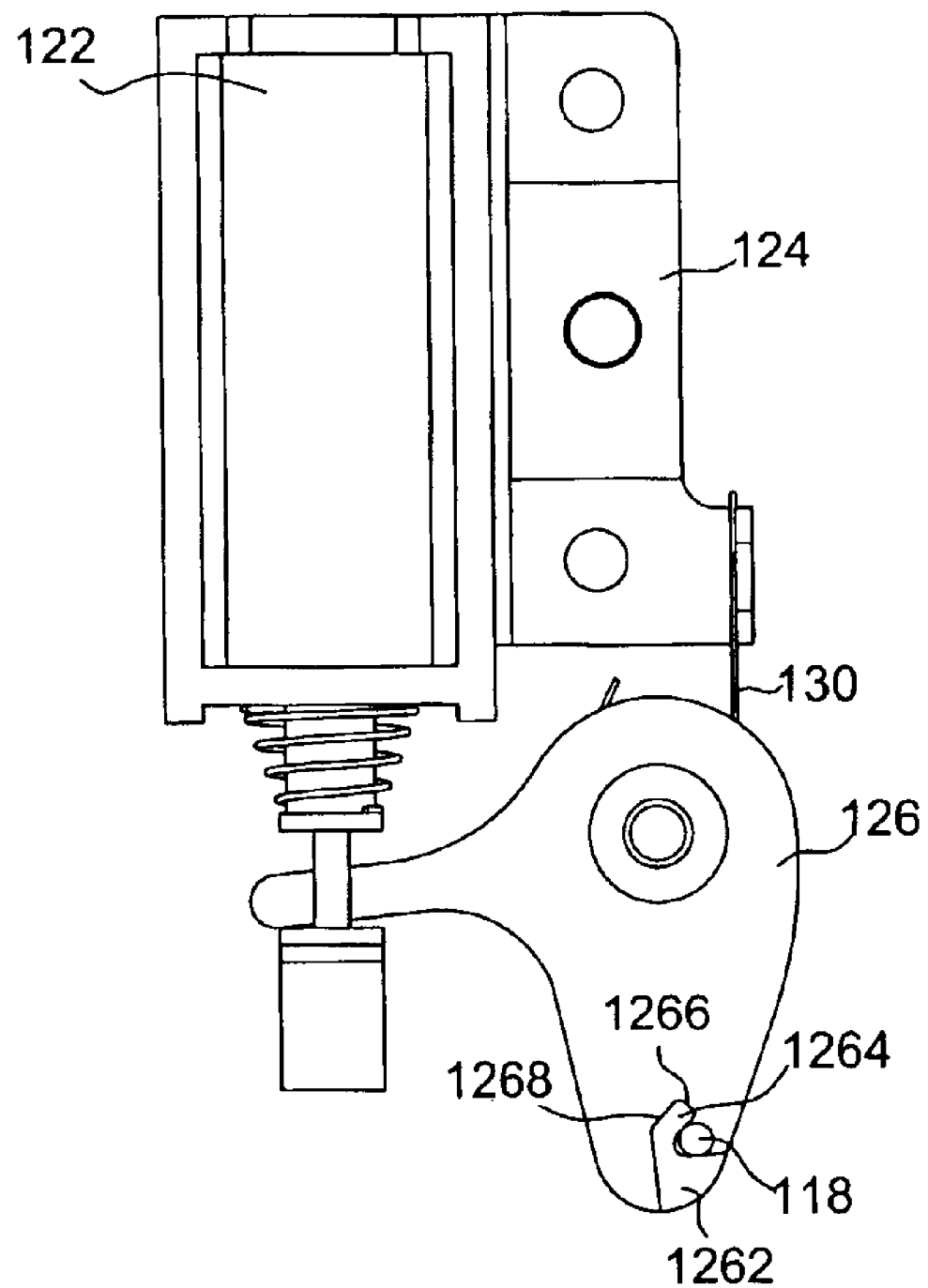
FIG. 5A to FIG. 5D are diagrams showing the positions of the locking pin when the block device is triggered and the tray is pushed toward the inner space of the disk drive.

FIG. 5A to FIG. 5D are diagrams showing positions of the locking pin 118 while the tray 106 is ejected manually. In FIG. 5A, the locking pin 118 engages with the latch 126, which has a blocking part 1262 and a guiding part 1264. The blocking part 1262 engages with the locking pin 118. The guiding part 1264 has a first surface 1266 and a second surface 1268 for guiding the movements of the locking pin 118.

Figure 5B:
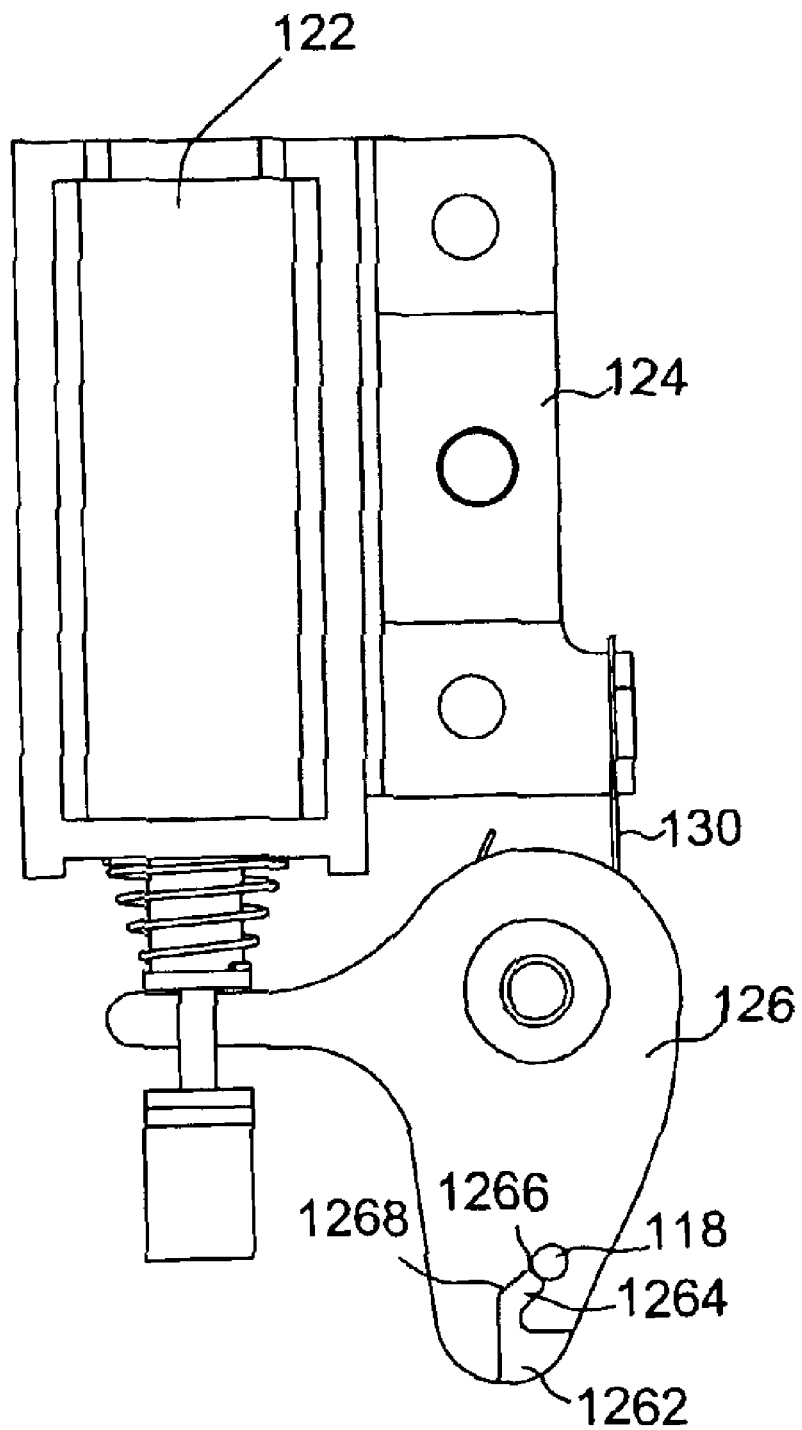
Figure 5C:
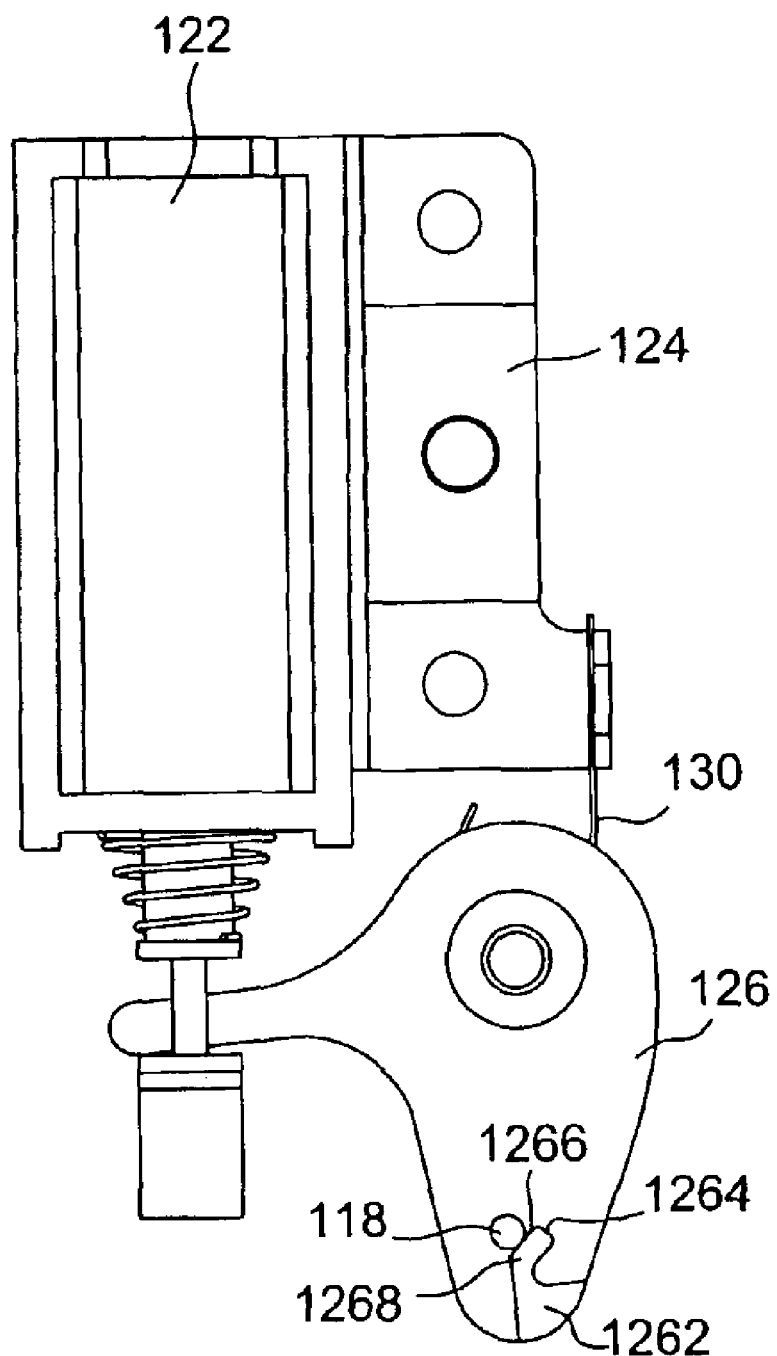
Figure 5D:
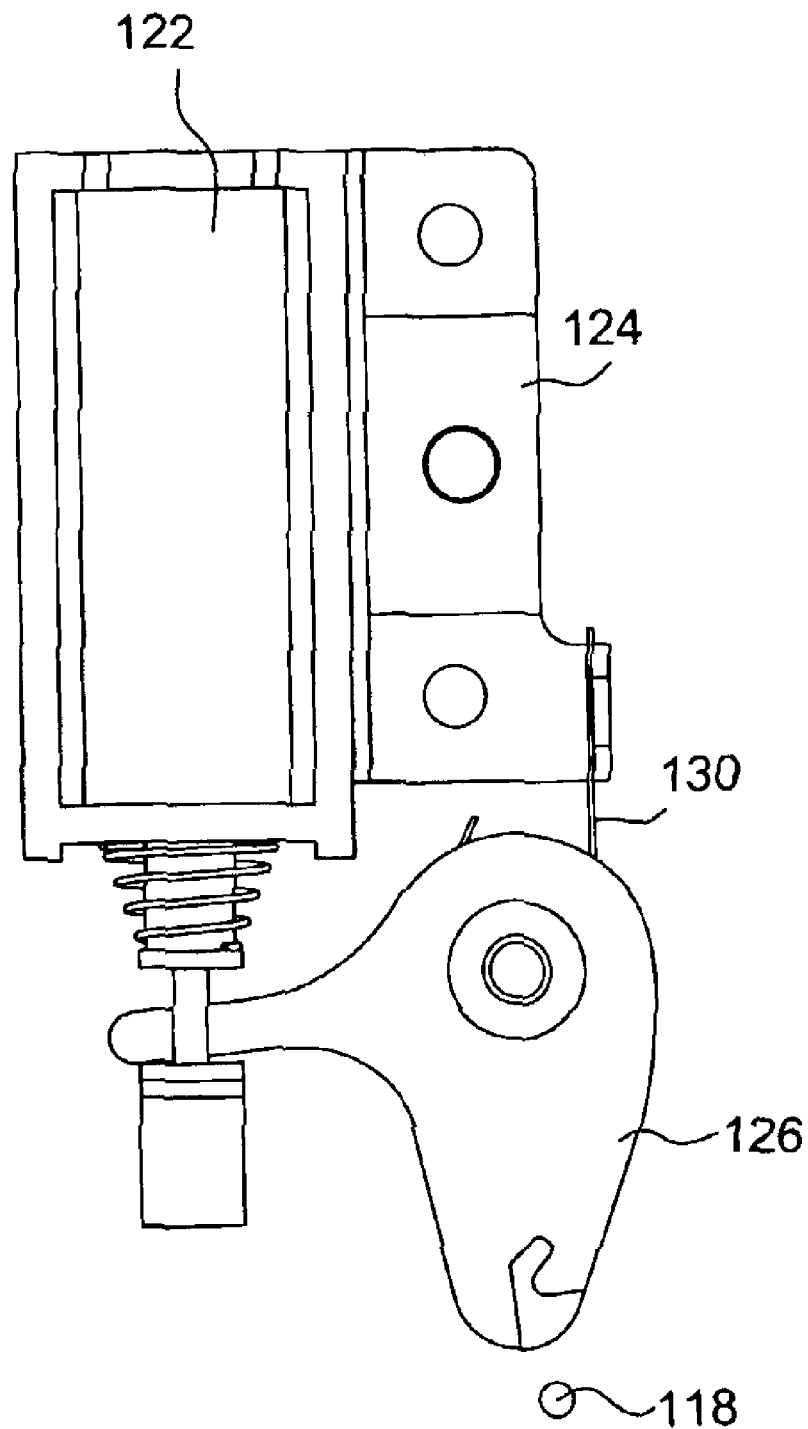

When the block device 110 is triggered and the tray 106 is pushed as shown in FIG. 4B, the locking pin 118 disposed on the tray 106 also moves toward the inner space of the housing 134. The locking pin 118 pushes the guiding part 1264 of the latch 126 to force the latch 126 to rotate. At this stage, the relative positions of the locking pin 118 and the latch 126 are shown in FIG. 5B. The locking pin 118 moves to the first surface 1266 and forces the latch 126 to rotate. After the rotation, the torsion spring 130, as shown in FIG. 1, forces the latch 126 to return to the original position. In the meantime, the locking pin 118 moves to the second surface 1268 when the latch 126 returns to the original position, as shown in FIG. 5C. At this stage, the locking pin 118 has escaped from the blocking part 1262. When the tray 106 is ejected from the housing 134 entirely, the locking pin 118 leaves the latch 126, as shown in FIG. 5D.

Figure 6A:
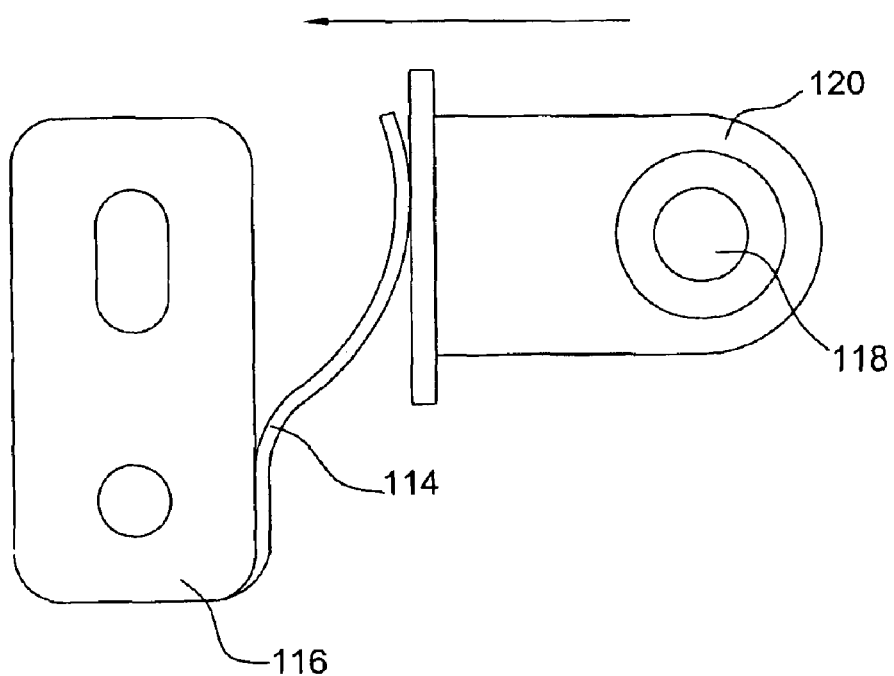
FIG. 6A and FIG. 6B are diagrams showing movements of a base and a leaf spring while the locking pin moves.
Figure 6B:
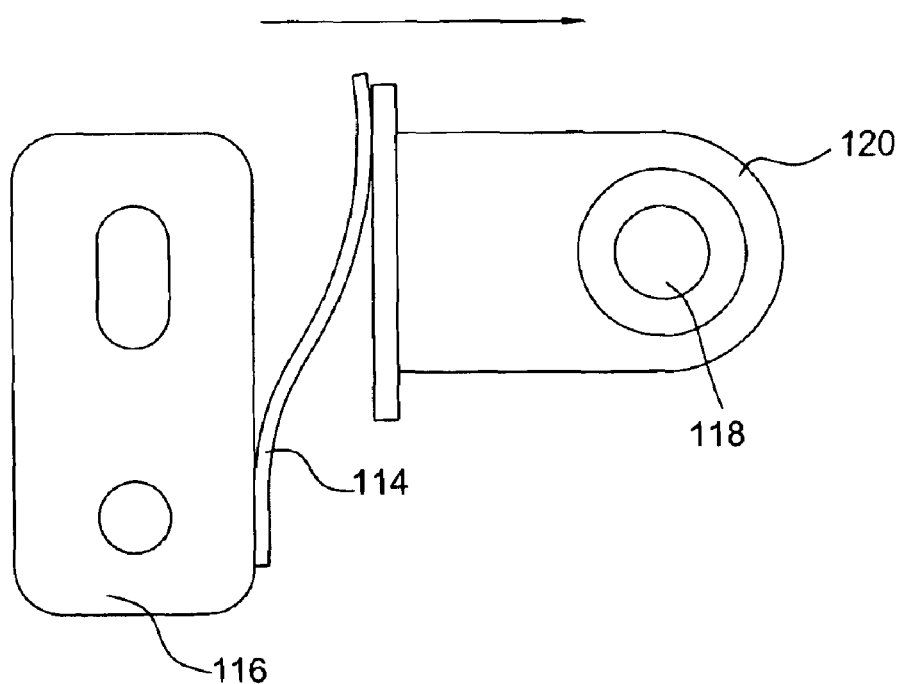

As illustrated in FIG. 6A and FIG. 6B, the leaf spring 114 provides a resilient force to drive the base 120 to move. In conjunction with FIG. 5A to FIG. 5D, the process of the tray 106 ejection is illustrated more clearly. While the positions of the locking pin 118 change from as in FIG. 5A to as in FIG. 5B, the base 120 moves in the arrow direction as shown in FIG. 6A. The leaf spring 114 is pressed while the base 120 moves. When the locking pin 118 is in the position as shown in FIG. 5C, the position of base 120 is as shown in FIG. 6B and the leaf spring 114 is still compressed. Afterwards, the locking pin 118 escapes from the latch 126 and the base 120 is pushed by the compressed leaf spring 114. Therefore, the base 120 moves in the arrow direction as shown in FIG. 6B and returns to the original position as in FIG. 6A. The locking pin 114 moves to the position as shown in FIG. 5D.

Positions of the locking pin 118 and the latch 126 may be exchanged. For example, the locking pin 118 can be disposed on the housing 134 and the latch 126 can be disposed on the tray 106. When the tray 106 is ejected, the latch 126 disposed on the tray 106 rotates and the locking pin 118 escapes from the blocking part 1262, as shown in FIG. 5B. Therefore, the tray 106 is ejected entirely. The equivalent substitute is apparent to persons skilled in the art, so is not described and illustrated redundantly.

The present invention provides a two-step ejection apparatus. The first step is that the stick 20 triggers the block device 110 to separate it from the housing 134, as shown in FIG. 4A. The second step is that the tray 106 is pushed toward the inner space of the disk drive, as shown in FIG. 4B. When the tray 106 is pushed, the positions of the locking pin 118 are as illustrated in figures from FIG. 5A to FIG. 5D. The tray 106 is ejected entirely while the locking pin 118 escapes from the latch 126.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as falling within the true scope of the invention.

What is claimed is:

1. A disk drive comprising:

a housing having an inner space;

a tray selectively received in the inner space; and an ejection apparatus having:

a locking pin movably disposed on the tray; and a latch rotatably disposed on the housing, the latch having a blocking part and a guiding part, the guiding part having a first surface and a second surface, the locking pin selectively engaging with the blocking part;

wherein, the locking pin engages with the blocking part limiting a movement of the tray when the tray is received in the inner space, and when the tray is pushed toward the inner space for a predetermined distance, the locking pin escapes from the blocking part and presses against the first surface forcing the latch to rotate so the locking pin is moved to the second surface, and the locking pin moves along the second surface such that the tray ejects from the inner space of the housing.

2. The disk drive of claim 1, wherein the ejection apparatus further comprises a base movably disposed on the tray, and the locking pin is disposed on the base.

3. The disk drive of claim 2, wherein the ejection apparatus further comprises a first resilient unit disposed on the tray and being adjacent to the base for forcing the base to move.

4. The disk drive of claim 1, wherein the ejection apparatus further comprises a second resilient unit disposed between the latch and the housing for forcing the latch to return to an original position.

5. The disk drive of claim 1, the disk drive further comprising a block device movably disposed on the tray, the block device having a protrusion, the protrusion touches against the housing when the tray is received in the inner space, and when the tray is ejected manually by pushing the tray toward the inner space for the predetermined distance, the protrusion escapes from the housing such that the locking pin escapes from the blocking part.

6. The disk drive of claim 5, the block device further comprising a third resilient unit disposed between the block device and the tray for forcing the block device to return to an original position.

7. The disk drive of claim 1, the disk drive further comprising a block device movably disposed on the housing, the block device having a protrusion, the protrusion touches against the tray when the tray is received in the inner space, and when the tray is ejected manually by pushing the tray toward the inner space for the predetermined distance, the protrusion escapes from the tray such that the locking pin escapes from the blocking part.

8. The disk drive of claim 7, the block device further comprising a third resilient unit disposed between the block device and the housing for forcing the block device returning to an original position.

9. A disk drive comprising:
   a housing having an inner space;
   a tray selectively received in the inner space; and
   an ejection apparatus having:
      a locking pin movably disposed on the housing; and
      a latch rotatably disposed on the tray, the latch having a blocking part and a guiding part, the guiding part having a first surface and a second surface, the locking pin selectively engaging with the blocking part.
   wherein, the locking pin engages with the blocking part limiting a movement of the tray when the tray is received in the inner space, and when the tray is pushed toward the inner space for a predetermined distance, the locking pin escapes from the blocking part and presses against the first surface forcing the latch to rotate so the locking pin is moved to the second surface, and the locking pin moves along the second surface such that the tray ejects from the inner space of the housing.

10. The disk drive of claim 9, wherein the ejection apparatus further comprises a base movably disposed on the housing, and the locking pin is disposed on the base.

11. The disk drive of claim 10, wherein the ejection apparatus further comprises a first resilient unit disposed on the housing and being adjacent to the base for forcing the base to move.

12. The disk drive of claim 9, wherein the ejection apparatus further comprises a second resilient unit disposed between the latch and the tray for forcing the latch to return to an original position.

13. The disk drive of claim 9, the disk drive further comprising a block device movably disposed on the tray, the block device having a protrusion, the protrusion touches against the housing when the tray is received in the inner space, and when the tray is ejected manually by pushing the tray toward the inner space for the predetermined distance, the protrusion escapes from the housing such that the locking pin escapes from the blocking part.

14. The disk drive of claim 13, the block device further comprising a third resilient unit disposed between the block device and the tray for forcing the block device to return to an original position.

15. The disk drive of claim 9, the disk drive further comprising a block device movably disposed on the housing, the block device having a protrusion, the protrusion touches against the tray when the tray is received in the inner space, and when the tray is ejected manually by pushing the tray toward the inner space for the predetermined distance, the protrusion escapes from the tray such that the locking pin escapes from the blocking part.

16. The disk drive of claim 15, the block device further comprising a third resilient unit disposed between the block device and the housing for forcing the block device to return to an original position.

* * * * *